United States Patent [19]
Grimm

[11] Patent Number: 5,334,848
[45] Date of Patent: Aug. 2, 1994

[54] SPACECRAFT DOCKING SENSOR SYSTEM

[75] Inventor: Gary E. Grimm, Redondo Beach, Calif.

[73] Assignee: TRW Inc., Redondo Beach, Calif.

[21] Appl. No.: 47,127

[22] Filed: Apr. 9, 1993

[51] Int. Cl.⁵ ............................................. G01N 21/86
[52] U.S. Cl. .................................. 250/548; 250/557; 356/141.2
[58] Field of Search ............... 250/226, 548, 557, 561; 356/141, 152, 400

[56] References Cited

U.S. PATENT DOCUMENTS

| | | | |
|---|---|---|---|
| 4,600,305 | 7/1986 | Priddy | 356/152 |
| 4,603,975 | 8/1986 | Cinzori | 356/152 |

Primary Examiner—David C. Nelms
Assistant Examiner—Stephone B. Allen
Attorney, Agent, or Firm—Noel F. Heal; Sol L. Goldstein

[57] ABSTRACT

Apparatus, and a corresponding method for its use, for producing an enhanced image of a reflective target on a remote object, such as a space vehicle with which docking maneuvers are being carried out. Radiation at two separate wavelengths illuminates the target, and reflected radiation is separated by wavelength to produce two images simultaneously. Because the target is responsive to only one of the wavelengths, but reflections from other objects are received for both wavelengths, subtraction of the two images substantially removes unwanted image components resulting from reflections from objects other than the target. Producing the two images simultaneously, using two cameras, ensures that the unwanted image components are substantially the same in the two images, and can therefore be removed by subtraction during image processing.

15 Claims, 1 Drawing Sheet

SPACECRAFT DOCKING SENSOR SYSTEM

BACKGROUND OF THE INVENTION

This invention relates generally to optical position detection systems and, more particularly, to autonomous docking systems for spacecraft. Docking one space vehicle with another is typically accomplished with the help of a navigational computer, which controls thrusters on one of the vehicles, which in turn control the position and attitude of the vehicle in three-dimensional space. Although docking might be accomplished by controlling both vehicles, for purposes of explanation it will be assumed that one of the vehicles is not controlled in position or attitude during the docking maneuver. It is further assumed that this vehicle has been stabilized in attitude such that it is not spinning and is in a docking attitude with respect to the other approaching vehicle. The navigational computer in the approaching vehicle depends for its operation on having accurate input data defining the position and relative orientation of the other vehicle. The invention is concerned with a new approach to providing these data.

Optical sensor systems typically use a reflective "target" affixed to the vehicle being approached. To distinguish the target from other nearby reflective objects, the target is responsive only to light of a selected wavelength, for example blue light. Unfortunately, reflections from other portions of the spacecraft also occur when a blue light source is used to detect the target. Elimination of "clutter" in the resulting image is effected by alternately illuminating the vehicle with blue light and light of another wavelength, such as red light. The red light is not reflected by the target but, in general, the other reflective portions of the vehicle reflect both red and blue light equally well. The image obtained from the red light is then subtracted from the image obtained from the blue light, thereby eliminating the clutter, at least in theory.

The principal difficulty with this approach is that the clutter components of the two images are generally not identical, because the non-target components vary with the relative positions of the vehicles. Consequently, even after differencing of the two images, multiple dots remain and some type of image processing algorithm is needed to help distinguish the target dot from the other dots in the image. The shape of the target is usually of no help in this regard until the distance between the vehicles is quite small.

It will be appreciated from the foregoing that there is still a need for improvement in autonomous spacecraft docking procedures, and in particular in the optical sensing systems used to generate position and attitude data for the navigational computer. The present invention satisfies this need.

SUMMARY OF THE INVENTION

The present invention resides in a method and apparatus for sensing the position of a reflective target in a way that eliminates the effects of unwanted image components resulting from reflections from objects other than the target. Briefly, and in general terms, the apparatus of the invention comprises means for generating electromagnetic radiation having two distinct wavelengths; a reflective target responsive to only one of the wavelengths; means for transmitting the radiation, to illuminate the reflective target, of which the exact position and orientation are initially unknown; filter means, for separating received reflected radiation into two wavelength bands containing the two respective transmitted wavelengths; camera means, for converting the received and filtered radiation simultaneously into two separate electronic images corresponding to received images in the two wavelength bands; and image processing means, including means for subtracting the two electronic images, one from the other, to yield an enhanced image of the reflective target, whereby unwanted reflections from other objects tend to be canceled in the means for subtraction.

More specifically, in the preferred embodiment of the invention the means for generating electromagnetic radiation include two semiconductor laser diodes for generating light at different wavelengths, and the camera means include two cameras, which may be charge-coupled-device (CCD) cameras. The filter means may include a beam splitter, for dividing received radiation into two separate received beams; two optical filters for passing light only in wavelength bands corresponding to the respective wavelengths of the laser diodes; and optical means for focusing the two separate filtered received beams into the respective cameras.

In even more specific terms, the apparatus is for use in docking a first space vehicle with a second space vehicle, and comprises means on the first space vehicle for generating electromagnetic radiation having two distinct wavelengths; a reflective target located on the second space vehicle, and responsive to only one of the wavelengths; means on the first space vehicle for transmitting the radiation, to illuminate the reflective target, of which the exact position and orientation are initially unknown; filter means on the first space vehicle, for separating received reflected radiation into two wavelength bands containing the two respective transmitted wavelengths; camera means on the first space vehicle, for converting the received and filtered radiation simultaneously into two separate electronic images corresponding to received images in the two wavelength bands; and image processing means, including means for subtracting the two electronic images, one from the other, to yield an enhanced image of the reflective target, whereby unwanted reflections from the second space vehicle tend to be canceled in the means for subtraction.

In terms of a novel method, the invention comprises the steps of generating electromagnetic radiation having two distinct wavelengths; transmitting the radiation, to illuminate a reflective target responsive to only one of the wavelengths, and of which the exact position and orientation are initially unknown; separating received reflected radiation into two wavelength bands containing the two respective transmitted wavelengths; converting the received and filtered radiation simultaneously into two separate electronic images corresponding to received images in the two wavelength bands; and subtracting the two electronic images, one from the other, to yield an enhanced image of the reflective target, whereby unwanted reflections from other objects tend to be canceled by the substracting step.

More specifically, the step of generating electromagnetic radiation includes generating light in two semiconductor laser diodes operating at two different wavelengths, and the step of separating the received radiation into two beams includes dividing received radiation into two separate received beams in a beam splitter, filtering the two received beams from the beam splitter to produce two filtered beams containing light only in wavelength bands corresponding to the respective wavelengths of the laser diodes, and focusing the two separate filtered received beams into two cameras used in the step of converting the beams to electronic images.

The invention may also be defined as a method for sensing space vehicle position and orientation while docking a first space vehicle with a second space vehicle. The method comprises the steps of generating, on the first space vehicle, electromagnetic radiation having two distinct wavelengths; transmitting the radiation, from the first space vehicle, to illuminate a reflective target responsive only to on of the wavelengths, and of which the exact position and orientation are initially unknown; separating, on the first space vehicle, received reflected radiation into two wavelength bands containing the two respective transmitted wavelengths; converting, on the first space vehicle, the received and filtered radiation simultaneously into two separate electronic images corresponding to received images in the two wavelength bands; and subtracting the two electronic images, one from the other, to yield an enhanced image of the reflective target, whereby unwanted reflections from the second space vehicle tend to be canceled by the subtracting step.

It will be appreciated from the foregoing that the present invention represents a significant advance in the field of image sensing and processing, especially as applied to space vehicle docking techniques. In particular, the invention provides an improved image of a reflective target, but eliminating unwanted image components due to reflections from objects other than the target. Obtaining dual images at different wavelengths simultaneously, ensures that the unwanted image components can be substantially eliminated by subtraction of the images. Other aspects and advantages of the invention will become apparent from the following more detailed description.

DESCRIPTION OF THE PREFERRED EMBODIMENT

Figure 1:
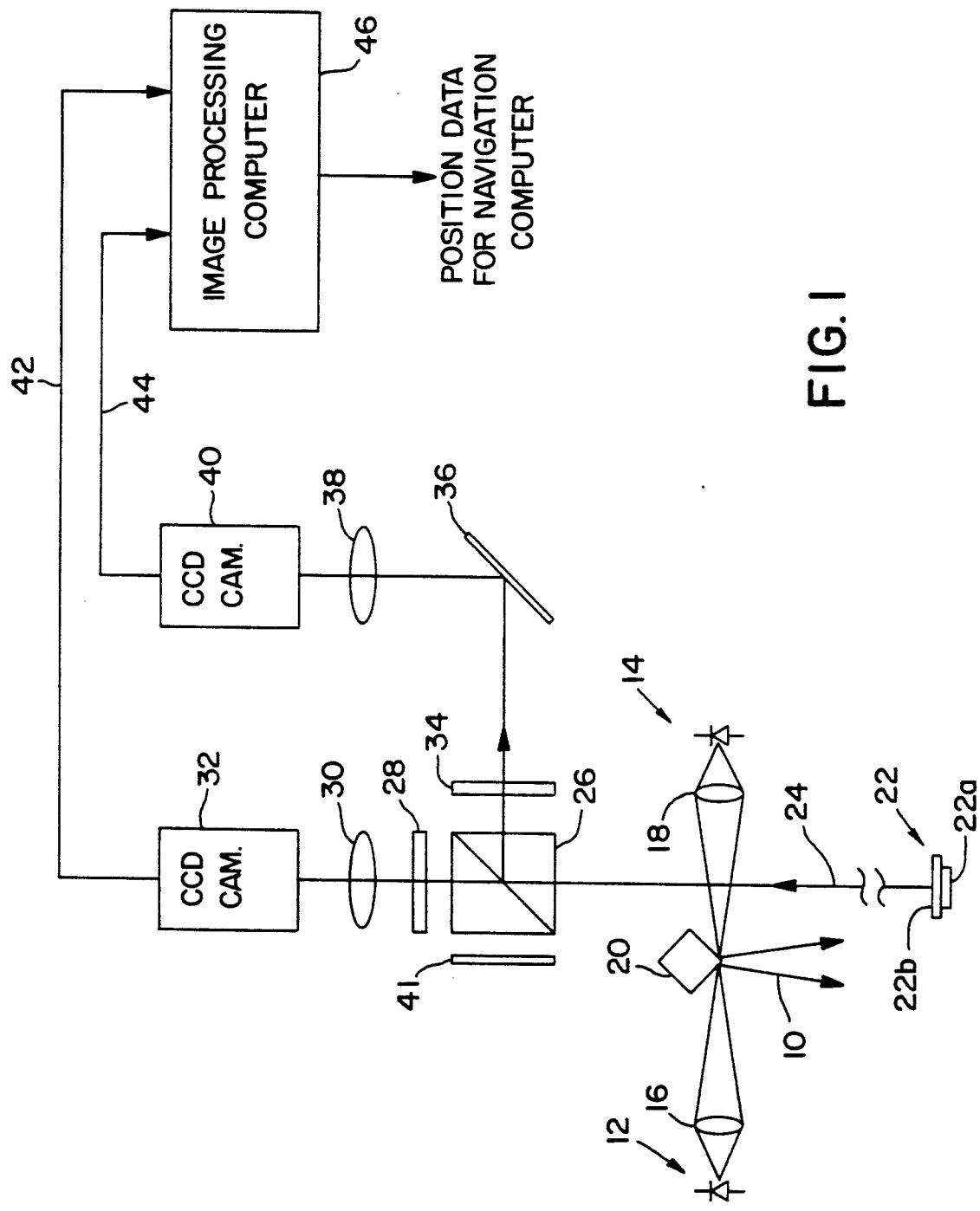
FIG. 1 is a schematic diagram of a sensor system in accordance with the invention.

As shown in the drawing for purposes of illustration, the present invention is concerned with an optical sensing system capable of determining the position of a remotely located reflector target. In the past, a single camera has been used to sense the target when alternately illuminated with two different wavelengths of light. The target reflects light of only one wavelength, but other surrounding objects generally reflect light of both wavelengths. Subtracting the successively formed images, one from the other, theoretically results in an image containing only the target.

In accordance with the invention, clutter resulting from unwanted reflections is greatly diminished by using two cameras, to record images resulting from the two wavelengths of light simultaneously. FIG. 1 shows an illuminating beam, indicated by reference numeral 10, formed from light from two laser diodes 12 and 14, one of which has a wavelength of 778 nanometers (nm) and the other of which has a wavelength of 820 nm. Light from the lasers 12 and 14 is directed through respective lenses 16 and 18 onto a cube reflector 20, which reflects the laser light along the common path of the illuminating beam 10. Alternatively, light from the semiconductor lasers 12 and 14 may be directed into optical fibers (not shown), which may be positioned in close proximity to each other at the focal point of an appropriate lens, to form the illuminating beam 10.

The illuminating beam 10 impinges on a reflective target 22, which, in the case of a docking system, is located on another space vehicle (not shown). Other objects or portions of the space vehicle on which the target is located also reflect light back to the sensor system. The target 22 includes a layer of reflective material 22a and an optical filter 22b that passes only light of approximately 778 nm wavelength. Thus the target 22 reflects only light having a wavelength of 778 nm. Reflected light is indicated by the path 24, which first encounters a beam splitter 26, which splits the received light into two approximately equal portions. One portion passes straight through the beam splitter 26, through a filter 28 that passes only light of 778 nm wavelength, though a lens 30 and into a charge-coupled-device (CCD) camera 32. The other portion of the received light is reflected from the beam splitter 26, passes through a second filter 34 that passes only light of 820 nm wavelength, and is then reflected from a mirror 36, through another lens 38, and into a second CCD camera 40. An opaque screen or stop, indicated diagrammatically at 41, ensures that light from other sources is not reflected into the first camera 32 by the beam splitter 26.

The first camera 32 records an image only from light of wavelength 778 nm, that is, light received from every reflecting object in the path of the illuminating beam 10, including the target 22. The second camera 40 records an image only from light of wavelength 820 nm, that is, light received from every reflecting object except the target 22. Electrical signals corresponding to the two camera images are transmitted over lines 42 and 44, respectively, to an image processing computer 46, which performs a frame subtraction function and produces a target image that is substantially free of clutter due to unwanted reflections. Further processing of the target image may be performed in the image processing computer 46, or in a navigation computer, using conventional algorithms to derive position and attitude data. For example, typically the target 22 actually comprises a pattern of three separate target dots. If the distance to the target is small enough, the relative spacing and orientation of the pattern of target dots can be used to determine the range and attitude of the vehicle being approached. However, the specific details of these algorithms are not part of the present invention, which is concerned only with reducing unwanted clutter in the target image.

It will be appreciated from the foregoing that the present invention represents a significant advance in the field of image sensing and processing, particularly as applied to autonomous docking systems for space vehicles. It will also be appreciated that, although a specific embodiment of the invention has been described in detail for purposes of illustration, various modifications may be made without departing from the spirit and scope of the invention. For example, the principles of the invention may be used in land vehicles for "electronic freeway" applications requiring automatic braking, acceleration or steering systems. Further, although the invention has been described as using light beams in the visible portion of the electromagnetic spectrum, it will be apparent that the principles of the invention apply equally well to systems employing invisible radiation, such as infrared, ultraviolet, or radio-frequency radiation. Accordingly, the invention should not be limited except as by the appended claims.

I claim:

1. Apparatus for forming an image of a reflective target, comprising:
   means for generating electromagnetic radiation having two distinct wavelengths;
   a reflective target responsive to only one of the wavelengths;
   means for transmitting the radiation, to illuminate the reflective target, of which the exact position and orientation are initially unknown;
   filter means, for separating received reflected radiation into two wavelength bands containing the two respective transmitted wavelengths;
   camera means, for converting the received and filtered radiation simultaneously into two separate electronic images corresponding to received images in the two wavelength bands; and
   image processing means, including means for subtracting the two electronic images, one from the other, to yield an enhanced image of the reflective target, whereby unwanted reflections from other objects tend to be canceled in the means for subtraction.

2. Apparatus as defined in claim 1, wherein:
   the means for generating electromagnetic radiation include two semiconductor laser diodes for generating light at different wavelengths.

3. Apparatus as defined in claim 2, wherein:
   the camera means include two separate cameras.

4. Apparatus as defined in claim 3, wherein the filter means includes:
   a beam splitter, for dividing received radiation into two separate received beams;
   two optical filters for passing light only in wavelength bands corresponding to the respective wavelengths of the laser diodes; and
   optical means for focusing the two separate filtered received beams into the respective cameras.

5. Sensing apparatus for use in docking a first space vehicle with a second space vehicle, the apparatus comprising:
   means on the first space vehicle for generating electromagnetic radiation having two distinct wavelengths;
   a reflective target located on the second space vehicle, and responsive to only one of the wavelengths;
   means on the first space vehicle for transmitting the radiation, to illuminate the reflective target, of which the exact position and orientation are initially unknown;
   filter means on the first space vehicle, for separating received reflected radiation into two wavelength bands containing the two respective transmitted wavelengths;
   camera means on the first space vehicle, for converting the received and filtered radiation simultaneously into two separate electronic images corresponding to received images in the two wavelength bands; and
   image processing means, including means for subtracting the two electronic images, one from the other, to yield an enhanced image of the reflective target, whereby unwanted reflections from the second space vehicle tend to be canceled in the means for subtraction.

6. Apparatus as defined in claim 5, wherein:
   the means for generating electromagnetic radiation include two semiconductor laser diodes for generating light at different wavelengths.

7. Apparatus as defined in claim 6, wherein:
   the camera means include two separate cameras.

8. Apparatus as defined in claim 7, wherein the filter means includes:
   a beam splitter, for dividing received radiation into two separate received beams;
   two optical filters for passing light only in wavelength bands corresponding to the respective wavelengths of the laser diodes; and
   optical means for focusing the two separate filtered received beams into the respective cameras.

9. A method for forming an image of a reflective target, comprising the steps of:
   generating electromagnetic radiation having two distinct wavelengths;
   transmitting the radiation, to illuminate a reflective target responsive to only one of the wavelengths, and of which the exact position and orientation are initially unknown;
   separating received reflected radiation into two wavelength bands containing the two respective transmitted wavelengths;
   converting the received and filtered radiation simultaneously into two separate electronic corresponding to received images in the two wavelength bands; and
   subtracting the two electronic images, one from the other, to yield an enhanced image of the reflective target, whereby unwanted reflections from other objects tend to be canceled by the subtracting step.

10. A method as defined in claim 9, wherein:
    the step of generating electromagnetic radiation includes generating light in two semiconductor laser diodes operating at two different wavelengths.

11. A method as defined in claim 10, wherein the step of separating the received radiation into two beams includes:
    dividing received radiation into two separate received beams in a beam splitter;
    filtering the two received beams from the beam splitter to produce two filtered beams containing light only in wavelength bands corresponding to the respective wavelengths of the laser diodes; and
    focusing the two separate filtered received beams into two cameras used in the step of converting the beams to electronic images.

12. A method for sensing space vehicle position and orientation while docking a first space vehicle with a second space vehicle, the method comprising the steps of:
    generating, on the first space vehicle, electromagnetic radiation having two distinct wavelengths;
    transmitting the radiation, from the first space vehicle, to illuminate a reflective target responsive only to on of the wavelengths, and of which the exact position and orientation are initially unknown;
    separating, on the first space vehicle, received reflected radiation into two wavelength bands containing the two respective transmitted wavelengths;
    converting, on the first space vehicle, the received and filtered radiation simultaneously into two separate electronic images corresponding to received images in the two wavelength bands; and subtracting the two electronic images, one from the other, to yield an enhanced image of the reflective target, whereby unwanted reflections from the second space vehicle tend to be canceled by the subtracting step.

13. A method as defined in claim 12, wherein:

the step of generating electromagnetic radiation includes generating light at two different wavelengths in two semiconductor laser diodes.

14. A method as defined in claim 13, wherein:

the converting step is performed in two separate cameras.

15. A method as defined in claim 14, wherein the separating step includes:

dividing received radiation into two separate received beams in a beam splitter;

filtering the two received beams from the beam splitter to produce two filtered beams containing light only in wavelength bands corresponding to the respective wavelengths of the laser diodes; and two optical filters for passing light only in wavelength bands corresponding to the respective wavelengths of the laser diodes; and focusing the two separate filtered received beams into the two cameras used in the step of converting the beams to electronic images.

* * * * *